United States Patent [19]

Krause et al.

[11] Patent Number: 4,788,929
[45] Date of Patent: Dec. 6, 1988

[54] FLUID INDICATOR FOR REFRIGERATION SYSTEM

[75] Inventors: Walter O. Krause; Peter J. Davis, Newark, both of N.Y.

[73] Assignee: Parker-Hannifin Corporation, Cleveland, Ohio

[21] Appl. No.: 206,641

[22] Filed: Jun. 14, 1988

[51] Int. Cl.$^4$ .............................................. G01F 15/04
[52] U.S. Cl. ........................................ 116/276; 73/323
[58] Field of Search ............... 116/276, 264, 200, 201, 116/207, 227; 73/290 R, 323, 324, 325, 326, 327, 328, 329, 330, 331, 332, 333, 334

[56] References Cited

U.S. PATENT DOCUMENTS

| | | | |
|---|---|---|---|
| 2,681,034 | 6/1954 | Mannion | 116/276 |
| 2,844,026 | 7/1958 | Wischmeyer et al. | 116/276 |
| 3,158,130 | 11/1964 | Szymanski | 116/276 |
| 3,888,205 | 6/1975 | Vitticore et al. | 116/276 |
| 4,064,826 | 12/1977 | Pauli | 116/276 |
| 4,621,527 | 11/1986 | Varga et al. | 116/227 |

FOREIGN PATENT DOCUMENTS 884020 12/1961 United Kingdom ................ 116/276

Primary Examiner—William A. Cuchlinski, Jr.
Assistant Examiner—Petar Arsenovic
Attorney, Agent, or Firm—Ralph E. Jocke

[57] ABSTRACT

A fluid indicator for viewing the condition of refrigerant flowing therethrough includes a brass body (12) having a cylindrical extending portion (26). The cylindrical extending portion includes a recess (30) bounded by a deflectable wall (28). An aperture (14) which includes a transparent glass pane (36) surrounded by a steel ring (38) is mounted in the recess and fixed therein by braze material. Tubes (16, 18) are brazeable into coupling portions (20, 22) of the body, and the fluid tight character of the indicator is unaffected despite failure to use a chill block, wet rag or other cooling device during the brazing operations.

1 Claim, 3 Drawing Sheets

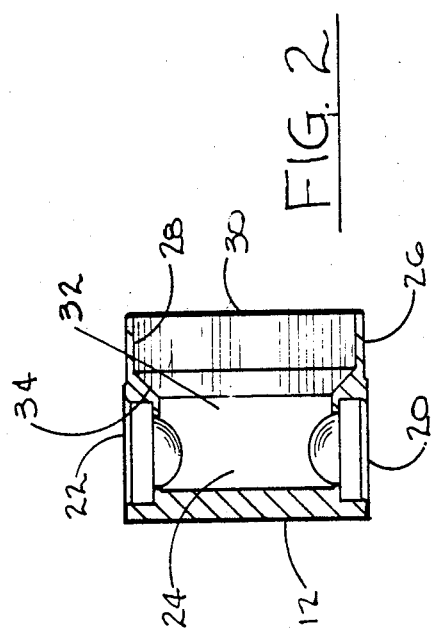
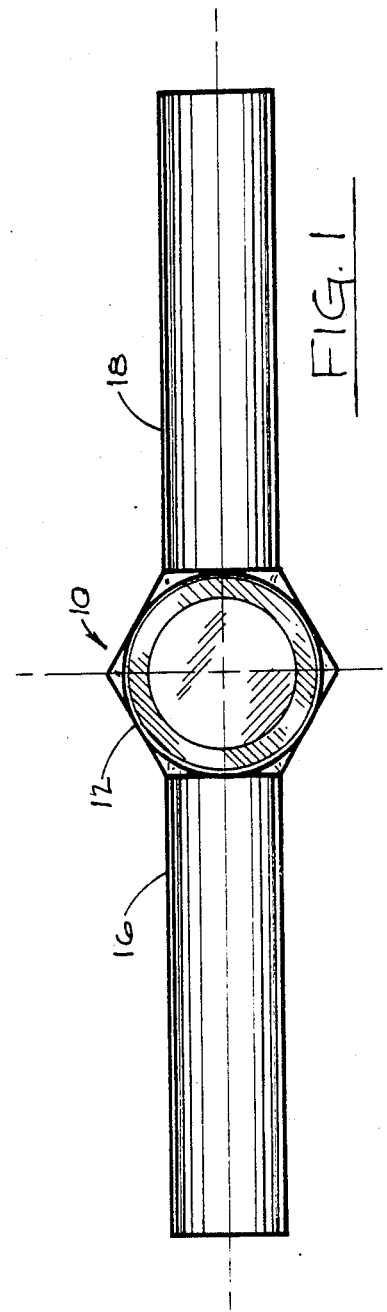

FLUID INDICATOR FOR REFRIGERATION SYSTEM

TECHNICAL FIELD

This invention relates to fluid indicators. Particularly, this invention relates to fluid indicators installed in lines of refrigeration systems which enable inspection of the condition of the refrigerant flowing therein.

BACKGROUND ART

Fluid indicators or "sight glasses" are often installed in the lines of refrigeration systems. Fluid indicators customarily incorporate a glass pane or other transparent aperture which allows a technician to view the refrigerant flowing in the line. By viewing the refrigerant as it passes through the indicator, a technician can determine that refrigerant is flowing satisfactorily and therefore the components upstream of the indicator are not plugged. By viewing the level and appearance of the refrigerant, the technician may also determine that the system needs to be charged with additional refrigerant or that the system needs to be charged with additional refrigerant or that the refrigerant is in need of replacement due to contamination.

Fluid indicators are typically installed by brazing the body of the indicator to the copper tubing through which the refrigerant flows. In conventional fluid indicators, the aperture portion is held in the body with low temperature solder material. As a result, the temperatues generated during brazing operations can cause the solder to melt. This destroys the liquid tight character of the fluid indicator and results in refrigerant leakage. To assure that the solder holding the aperture does not melt during brazing, it is conventional practice to apply a wet rag or chill block to the indicator body. These cooling devices maintain the solder in a solid condition while the tubing connections are brazed. The need to use these cooling devices is an inconvenience because they are time consuming and messy. In addition, even though the person installing the fluid indicator may use a cooling device, the solder seal around the aperature is sometimes destroyed.

Applicants' prior attempts to develop a liquid indicator with an aperture held in place by higher temperature brazing material instead of solder have been unsuccessful. The reason for this is that the indicator bodies are traditionally made of brass. Brazing material solidifies at such a high temperature that the brass body continues to contract after the brazing material has solidified. The contraction of the brass body after the brazing material is fixed, applies a compression force to the aperture. This resulted in the glass pane cracking either after the aperture was brazed in place or while brazing tubing to the fluid indicator.

Thus, there exists the need for a fluid indicator which may be successfully brazed to refrigerant tubing without the use of a chill block, wet rag or other cooling device.

DISCLOSURE OF INVENTION

It is an object of the present invention to provide a fluid indicator that can be brazed to tubing without use of a chill block, wet rag or other cooling device.

It is a further object of the present invention to provide a fluid indicator that is resistant to refrigerant leakage.

It is a further object of the present invention to provide a fluid indicator that successfully withstands high fluctuations in temperature.

Further objects of the present invention will be made apparent in the following best modes for carrying out the invention and the appended claims.

The foregoing objects are accomplished by a fluid indicator which enables viewing of refrigerant flowing therethrough. The indicator has an aperture which includes a circular glass pane surrounded by a steel ring. The pane and ring are held together by an interference fit and are fused to form a liquid tight assembly.

The indicator also includes a brass body. The brass body incorporates first and second braze coupling portions into which refrigerant tubes are attached by brazing. The body also has an internal cavity which is in fluid connection with the coupling portions so that the refrigerant is enabled to flow therethrough.

The body also includes a cylindrical projecting portion above the cavity. The projecting portion includes a cylindrical recess which accepts the aperture in close fitting relation. The recess has at its bottom an inwardly tapered ledge on which the ring of the aperture normally rests.

The projecting portion and recess surrounding the aperture form a deflectable cylindrical wall. The wall is sized in thickness such that it will deflect when subjected to a force. The force at which the wall deflects is less than the force required to cause the glass pane in the aperture to fracture.

An opening in the body of the liquid indicator extends generally along the axis of the aperture from the cavity to the recess. This enables refrigerant flowing through the body to be observed through the glass pane.

The aperture is fixed in the recess by brazing the steel ring to the deflectable wall. The brazing material is supplied between the body and the aperture to provide a liquid tight seal. The heat applied to the indicator during the brazing process causes the brass body and the aperture portion to expand. Upon cooling, the brass body contracts applying a force to the aperture. However, the deflectable wall bends to relieve the stress which would otherwise cause the glass to fracture.

When the fluid indicator is brazed to refrigerant tubing, the high temperature braze material holding the aperture remains solid even though no chill block, wet rag or other cooling device is used. This insures that the liquid tight character of the brazed seal between the body and the aperture is preserved. Brazing the tubing to the body also causes expansion and contraction of the indicator due to changes in temperature. The deflectable wall bends to accommodate these dimensional changes and the integrity of the aperture and seal around it are preserved.

BRIEF DESCRIPTION OF THE DRAWINGS

FIG. 1 is a top plan view of the preferred form the fluid indicator of the present invention installed between two sections of tubing.

FIG. 2 is a cross sectional view of the body portion of the fluid indicator.

BEST MODES FOR CARRYING OUT INVENTION

Figure 3:
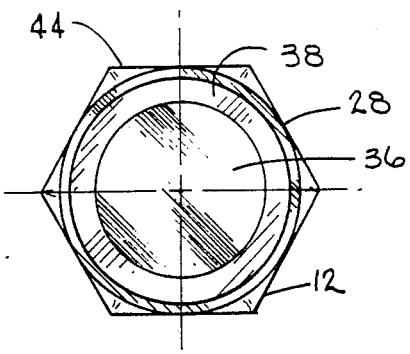
FIG. 3 is a top view of the fluid indicator.
Figure 4:
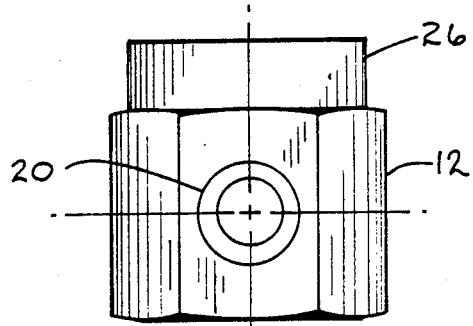
FIG. 4 is a side elevational view of the fluid indicator.

Referring now to the drawings and particularly to FIG. 1, there is shown therein the preferred form of the fluid indicator of the present invention generally indicated 10. The indicator includes a hexagonal brass body portion 12 and a circular aperture portion 14. The fluid indicator is shown connected between two sections of refrigerant tubing lines 16 and 18 which are attached to body 12 by a brazing material as later explained.

As shown in FIG. 2, body 12 includes a first brazed coupling portion 20 and a second brazed coupling portion 22. The braze coupling portions are sized to accept lines 16 and 18 respectively. Body 12 also includes an internal cavity 24 in fluid communication with the coupling portions 20 and 22. Body 12 also includes a cylindrical projecting portion 26 (see Figure 24) which extends outward and above cavity 24. Projecting portion 26 includes a cylindrical wall 28. A cylindrical recess 30 geneally indicated 30, is formed in inside wall 28 and is coaxial with said projecting portion. Recess 30 terminates at a ledge 34 which is tapered radially inward and toward said cavity. An opening 32 extends between cavity 24 and recess 30 inside body 12.

Figure 5:
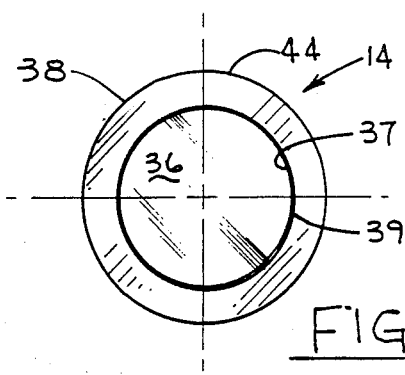
FIG. 5 is a top view of the aperture portion of the fluid indicator.
Figure 6:
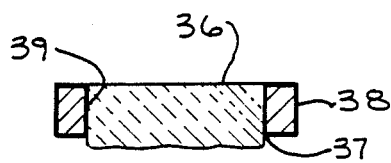
FIG. 6 is a side, cross sectional view of the aperture portion.

As shown in FIGS. 5 and 6, aperture portion 14 includes a circular clear glass pane 36. Glass pane 36 is bounded by a cylindrical outer surface 37. A steel ring 38 includes an inner circumferential surface 38 and an outer circumferential surface 44. The cylindrical outer surface 37 of pane 36 is assembled in an interference fit with the inner circumferential surface 39 of steel ring 38 to form a liquid tight assembly. This is accomplished by sizing the pane and ring to have slight clearance at room temperature. The pane and ring are heated to about 2050° F. At that temperature the glass melts and flows to contact the inside of the ring. Upon subsequent cooling, the glass solidifies. On further cooling, the steel ring contracts substantially more than the glass to create a tight interference fit. In addition, the cylindrical outer surface of the pane bonds to the inner circumferential surface of the ring as a result of natural oxidation of the metal which further causes the parts to bond together.

In the preferred form of the invention, applicants' use a glass pane having a diameter at room temperature in the range of 0.556±0.002 inches, and a thickness in the range of 0.090±0.001 inches. The steel ring has an outer diameter in the range of 0.802±0.002 inches, an inner diameter in the range of 0.560±0.005 inches and a thickness of 0.172±0.005 inches. As shown in FIG. 6, the glass pane extends slightly below the steel ring towards said cavity when the aperture is assembled due to the difference in thickenss between the ring and pane. Applicants also coat the ring in the preferred form of the invention electrolytically with a coating of nickel prior to assembly of the aperture. This coating is in the range of 0.0003 to 0.0004 inches. The nickel coating enhances the appearance of the aperture and avoids corrosion.

The fluid indicator is assembled by inserting aperture portion 14 in recess 30. In this position, ring 38 is supported on the top of ledge 34 where the ledge meets the wall. Aperture 14 is joined to body 12 by brazing wall 28 to ring 38 along the outer circumferential surface 44 of the steel ring. Sufficient braze material is supplied between the wall and the ring to form a liquid tight seal.

Wall 28 is sized to be sufficiently thin so it will deflect if a large force is applied in the area where the aperture is brazed to said wall. The force sufficient to cause the wall to deflect is less than the radial compression force which must be applied to the steel ring portion of the aperture to fracture glass pane 36. In the preferred form of the invention, the wall is approximately 0.025 inches thick.

When body 12 and aperture portion 13 are heated during brazing of the aperture to the body, the brass expands substantially more than the aperture portion due to the different coefficients of expansion of the materials. When the brazing operation is complete and the parts cool, the braze material solidifies before the brass body is fully contracted. For this reason, the braze material between outer circumferential surface 44 of steel ring 38, and the inside of wall 28 results in a compression force on the aperture. However in the preferred form of the invention, wall 28 deflects to relieve the stress applied to aperture portion 14. The steel ring surrounding the glass pane further assists in preserving the integrity of the aperture by providing rigidity and distributing the applied stress.

When refrigerant lines 16 and 18 are brazed to the coupling portions of body 12, the heat of the brazing operation causes body 12 to expand. However, the heat generated is insufficient to melt the braze material which holds the aperture portion in the recess. This insures preservation of the fluid tight seal. Wall 28 deflects to accommodate the expansion and contraction thereby avoiding damage to the aperture portion. Therefore, it is not necessary to use a chill block, wet rag or other cooling device during the brazing operation.

Thus, the new fluid indicator achieves the above stated objectives, eliminates difficulties encountered in the use of prior devices, solves problems and obtains the desirable results described herein.

In the foregoing description, certain items have been used for brevity, clarity and understanding, however, no unnecessary limitations are to be applied therefrom because such terms are for descriptive purposes and are intended to be broadly construed. Moreover, the descriptions and illustrations are by way of examples and the invention is not limited to the details shown and described.

Having described the features, discoveries and principles of the invention, the manner in which it is constructed and operated, and the advantages and useful results obtained; the new and useful structures, devices, elements, arrangements, parts, calculations, systems, equipment, operations and relationships are set forth in the appended claims.

We claim:

1. A refrigeration fluid indicator for viewing the condition of refrigerant fluid flowing therethrough, said indicator being fluid tight and suitable for connection to an inlet tube and outlet tube by a brazing process without use of a cooling block, wet rag or other cooling device, comprising:
    a brass body including:
    first and second brazeable tube coupling means;
    an internal cavity in aid body, said cavity in fluid communication with said first and second brazeable tube coupling means;
    a cylindrical extending portion positioned above said cavity, said cylindrical extending portion including a cylindrical recess, said recess bounded circumferentially by a deflectable wall, said wall deflectable in response to application of a deflection force, and by a ledge adjacent said cavity, said ledge tapered radially inward and toward said cavity;

an opening in said body generally coaxial with said recess and extending between said cavity and said recess; an aperture portion in said recess, said aperture portion including:

a generally circular glass pane having a cylindrical outer surface;

a steel ring having an inner circumferential surface and an outer circumferential surface, said outer circumferential surface proximate said deflectable wall of said body;

holding means for holding said cylindrical outer surface of said pane to said inner circumferential surface of said ring in fluid tight relation, said glass pane of said aperture portion being fracturable when a fracture force is applied to said aperture portion, said fracture force being greater than said deflection force;

braze means for holding said deflectable wall and said outer circumferential surface of said aperture in fluid tight relation;

whereby said inlet and outlet tubes are enabled to be fixed in said tube coupling means of said fluid indicator by said brazing process without fracture of said glass pane or loss of said fluid tight character of said indicator

* * * * *